Patented Aug. 1, 1939

2,167,757

UNITED STATES PATENT OFFICE 2,167,757

MANUFACTURE OF TETRA ALKALI-METAL PYROPHOSPHATE AND CHLORINE

Fredrick C. Jelen, Anniston, Ala., assignor, by mesne assignments, to Monsanto Chemical Company, a corporation of Delaware No Drawing. Application July 11, 1936,
Serial No. 90,184

6 Claims. (Cl. 23—106)

This invention relates to a method for manufacturing chlorine.

One object of the present invention is the provision of a process for cheaply manufacturing chlorine directly from an alkali metal chloride.

A further object of the present invention is the provision of a process for jointly manufacturing chlorine and an alkali metal phosphate.

I have now found that phosphorus pentoxide and certain alkali metal compounds thereof can be reacted with alkali metal chlorides, such as potassium or sodium chloride with the formation of chlorine, provided the reaction is carried out in substantial absence of water.

The new reactions which I have discovered may be expressed as follows:

1.
$$P_2O_5 + 2NaCl + \tfrac{1}{2}O_2 = 2NaPO_3 + Cl_2$$

This reaction takes place at approximately 650° C.

2.
$$P_2O_5 + 4NaCl + O_2 = Na_4P_2O_7 + Cl_2$$

This reaction takes place at approximately 1000° C.

3.
$$Na_2O \cdot P_2O_5 + 2NaCl + \tfrac{1}{2}O_2 = Na_4P_2O_7 + Cl_2$$

This reaction also takes place at approximately 1000° C.

The proportions of the reactants utilized in the practice of my process, as illustrated by the above reactions, are understood to extend over the range of one molecule of $P_2O_5$ to as much as four molecules of alkali metal chloride, that is the proportions may be chosen so as to form either the alkali metal meta phosphate and chlorine (Reaction 1), the tetra alkali metal pyrophosphate and chlorine, (Reaction 2) or compounds or mixtures of intermediate composition which are herein referred to as polyphosphates. If proportions are used so as to result in a reaction product having a greater content of alkali metal than that indicated by Reactions 2 and 3, then some unreacted chloride will be found in the reaction product.

While I have described the above reactions as taking place with sodium chloride to form chlorine and the sodium meta or pyro phosphate, it is also possible to react potassium chloride by the same reactions, forming potassium meta phosphate or potassium tetra pyrophosphate, as the case may be. And it is of course possible also to react mixtures of sodium and potassium chloride to form chlorine and the mixed sodium and potassium phosphates.

It is also possible, by employing suitable proportions to produce chlorine together with fused mixtures and compounds of sodium meta and tetra pyrophosphate. Such compounds are herein termed polyphosphates.

The reactions above described may be carried out by mixing the reactants together in the dry state and heating to the indicated reaction temperature which is in each case approximately the melting point of the compound or compounds formed by means of a source of heat which does not involve the elements of water. Where potassium chloride or other alkali metal chlorides are employed, the reaction temperature will also be that of the corresponding phosphates. Various sources of heat and means of heating are available.

For example I may place the reactants in a refractory brick lined furnace and heat the reacting mass with an electrical current introduced by means of electrodes extending into the fused salt bath. During operation oxygen is passed into, over or through the fused salt. When operating in this manner the fused salt bath for example, the sodium meta phosphate as produced by Reaction 1 above, acts as an electrical conductor within which heat energy is generated by an electrical alternating current flowing between suitable electrodes. The chlorine gas generater is in concentrated form.

Or I may generate heat by the combustion of carbon monoxide with air or oxygen. The reacting salt mixture is contained within a refractory lined hearth and carbon monoxide is burned above the fused salt under oxidizing conditions. The chlorine generated is diluted with the products of combustion and hence must be scrubbed out for concentration.

Another source of heat which I may utilize for carrying out the above chlorine forming reactions may be obtained by the combustion of phosphorus itself. In utilizing burning phosphorus as the source of heat I preferably burn molten or vaporized phosphorus in any approved manner in such a way as to obtain complete oxidation thereof and furthermore I utilize such proportions as to have remaining an excess of oxygen in the products of combustion. For such purposes I may utilize air or oxygen or even mixtures of the two, although for reasons which will later apear I prefer oxygen or oxygen enriched air.

The products from such a combustion containing vaporized phosphorus pentoxide and free oxygen are now passed into, over or through a mass of an alkali metal chloride. In the substantial absence of water or water vapor the reactions proceed as above indiacted.

When the products of combustion of the phosphorus contain inert gases as for example, when air or oxygen enriched air is employed, the chlorine generated in the above reaction will be diluted with such inert gases. Accordingly, when such a condition exists I concentrate the contained chlorine, either by compression or by absorption in an appropriate liquid or on a solid adsorbant. In many cases the diluted chlorine as thus obtained may be utilized directly for the manufacture of chlorinated products.

When a chlorine gas, free of inert diluting gases, is desired I prefer to utilize substantially pure oxygen as the oxidizing gas.

In order to obtain the maximum possible yield of chlorine from the chlorides used, it is desirable that the reactants entering into my process be as dry as possible. If substantial amounts of water are present either in the salts, in the phosphorus pentoxide or the heating media employed, this water will appear as hydrochloric acid gas mixed with the chlorine. For most purposes the presence of a small amount of hydrochloric acid gas is of no importance since it can readily be removed by appropriate scrubbing processes. The presence of such hydrochloric acid gas, however, represents a potential loss of chlorine and hence it is desirable when high efficiencies are to be obtained, to dry the materials entering into my process as well as practical under the circumstances.

The degree of drying which I find desirable should not be interpreted as including the so called "ultra drying" processes which have been realized in the laboratory. It is known for example that ultra dry phosphorus and oxygen will not combine. It is also known that other reactants behave abnormally when absolutely dry.

I do not contemplate nor desire that the reactants entering into my process be dried to an extent as to exhibit such abnormal properties. Undoubtedly moisture enters into the reactions herein described to some extent hence the gaseous chlorine produced will contain varying amounts of hydrochloric acid gas. If, however, the reactants are thoroughly dried as commercially practiced the reactions will be found to proceed substantially as indicated.

What I claim is:

1. A process for manufacturing tetra alkali metal pyrophosphate and chlorine comprising reacting together in the absence of water at a temperature of about 1000° C., an alkali metal chloride phosphorus pentoxide and oxygen in the proportion of 4 mols alkali metal, 1 mol of $P_2O_5$ and 1 mol of $O_2$ to form the tetra alkali metal pyrophosphate and chlorine.

2. The process defined in claim 1 in which the $P_2O_5$ is combined as a metaphosphate prior to reaction.

3. A process for manufacturing tetrasodium pyrophosphate and chlorine comprising reacting together in the absence of water at a temperature of about 1000° C., NaCl, $P_2O_5$ and $O_2$, in the proportion of 4 mols of Na, 1 mol of $P_2O_5$ and 1 mol of $O_2$, to form tetrasodium pyrophosphate and chlorine.

4. A process for manufacturing tetrasodium pyrophosphate and chlorine comprising reacting together in the absence of water and at a temperature of about 1000° C., $NaPO_3$, NaCl, and $O_2$ in the proportion of 4 mols of Na, 1 mol of $P_2O_5$ combined as $NaPO_3$ and at least ½ mol of oxygen to form tetrasodium pyrophosphate and chlorine.

5. A process for manufacturing tetrasodium pyrophosphate and chlorine comprising reacting together sodium metaphosphate, $NaPO_3$ and sodium chloride, NaCl, in the proportions of 2 mols of $NaPO_3$ to 2 mols of NaCl at a temperature of 1000° C. in the presence of oxygen and in the substantial absence of water, to produce tetrasodium pyrophosphate and chlorine.

6. A process for manufacturing tetrasodium pyrophosphate and chlorine comprising adding sodium chloride to molten $NaPO_3$ at a temperature of about 1000° C. in such proportions that the final melt contains 4 mols of Na to 1 mol of $P_2O_5$, said process being carried out under oxidizing conditions and in the substantial absence of water.

FREDRICK C. JELEN.